(No Model.) 3 Sheets—Sheet 1.
F. VANDERPOOL.
AUTOMATIC MEASURING AND REGISTERING APPARATUS FOR LIQUIDS.
No. 561,948. Patented June 9, 1896.
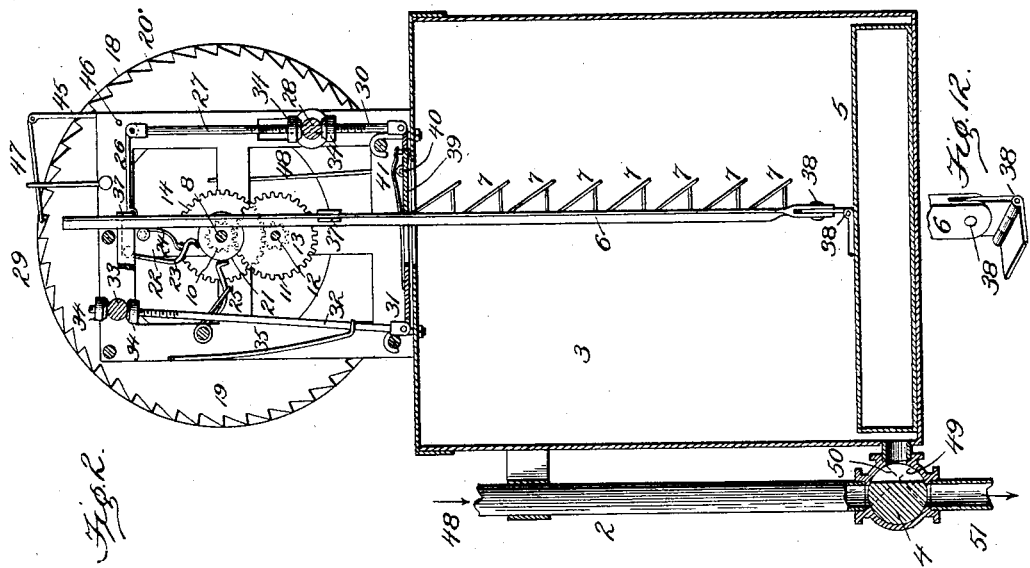
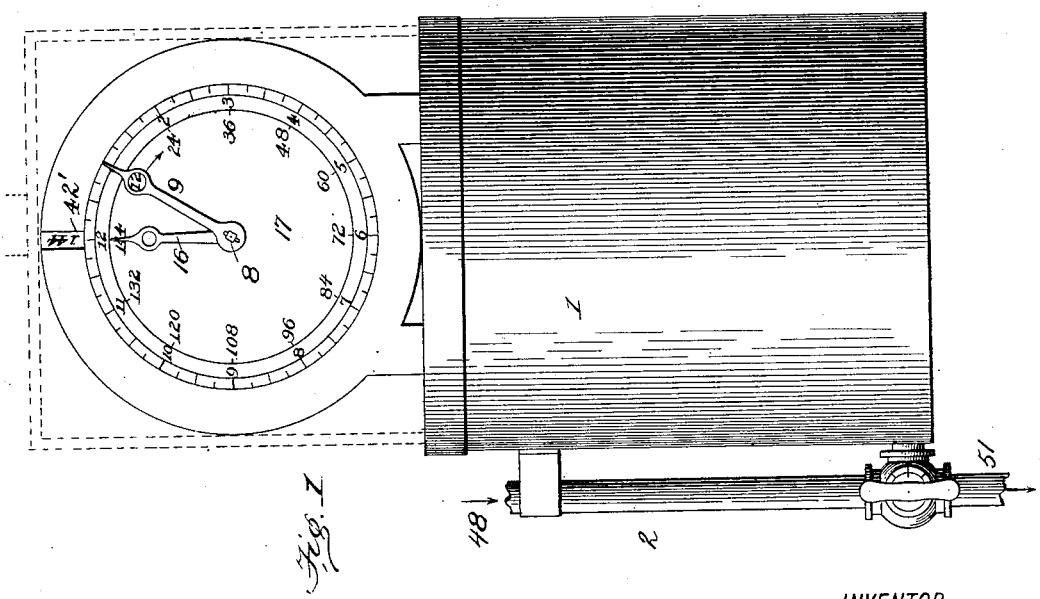
WITNESSES:
Edwin L. Bradford
Robt. A. McPherson Jr.
INVENTOR
Frederick Vanderpool
BY
Johnson & Johnson
ATTORNEYS

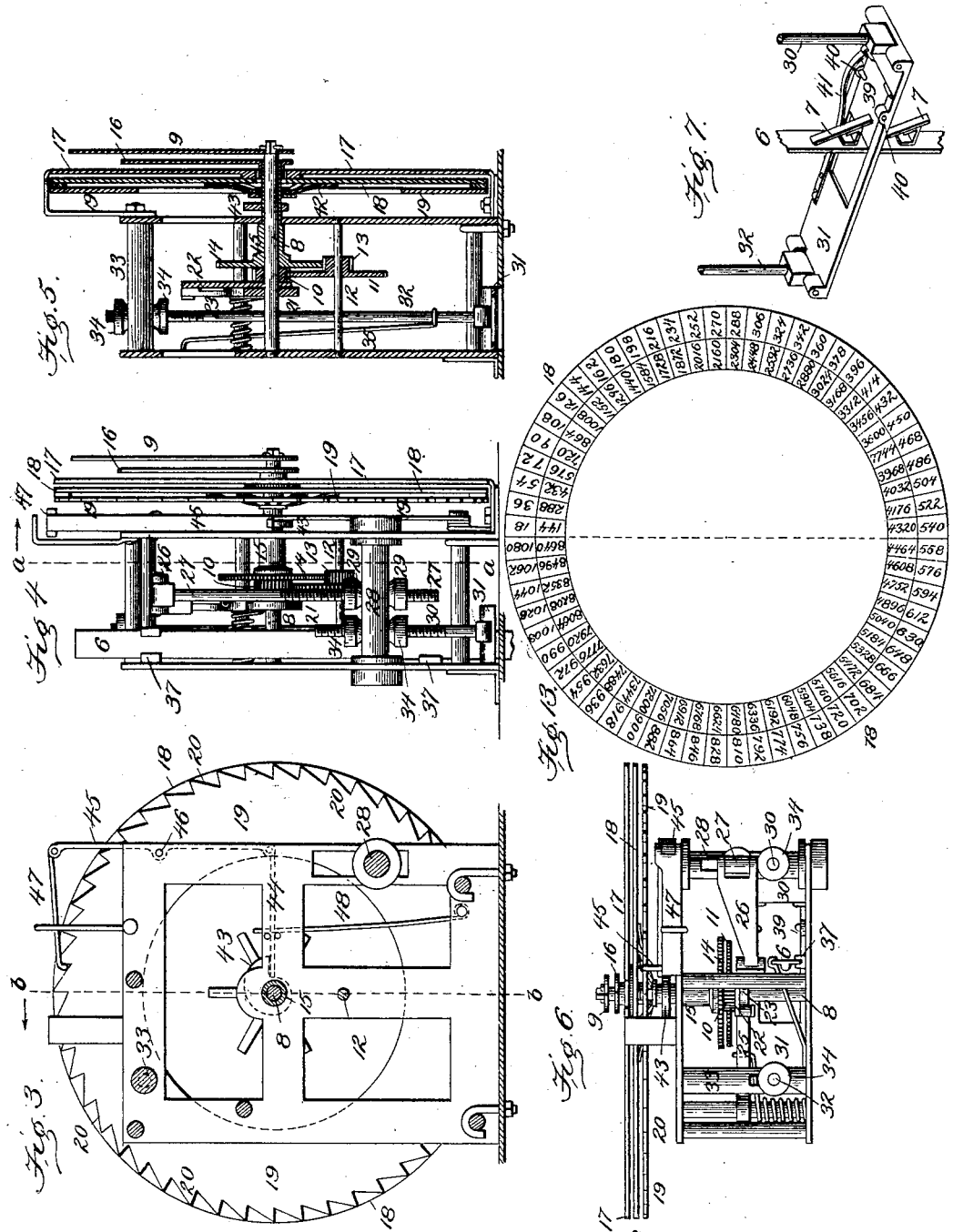

(No Model.) 3 Sheets—Sheet 3.
F. VANDERPOOL.
AUTOMATIC MEASURING AND REGISTERING APPARATUS FOR LIQUIDS.
No. 561,948. Patented June 9, 1896.
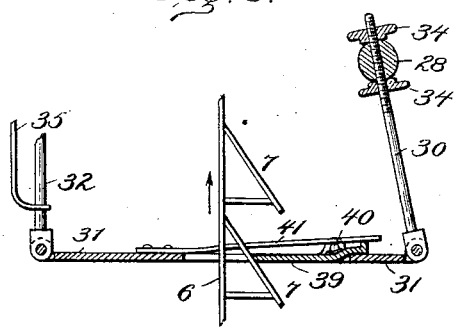
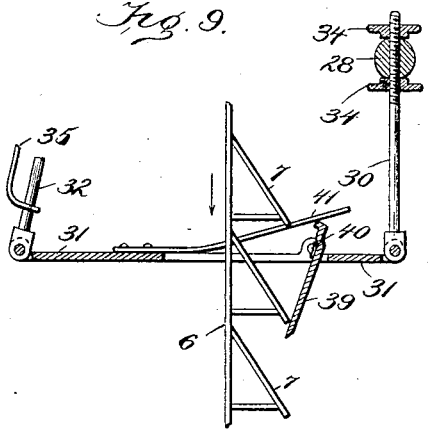
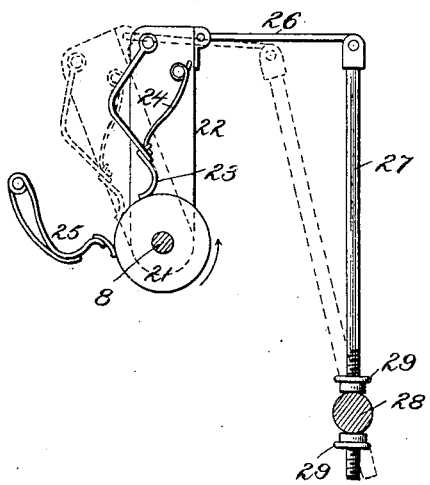
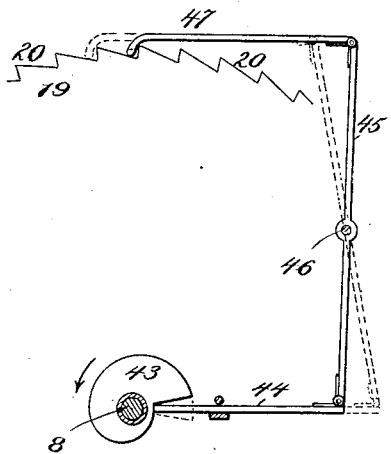
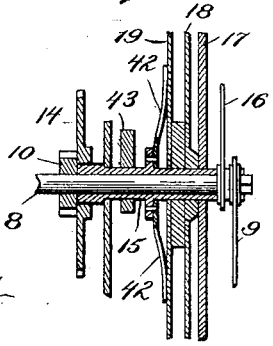
WITNESSES:
Edwin L. Bradford
Robt. A. McPherson Jr.
INVENTOR
Frederick Vanderpool
BY
Johnson & Johnson
ATTORNEYS

UNITED STATES PATENT OFFICE.

FREDERICK VANDERPOOL, OF GLOVERSVILLE, NEW YORK, ASSIGNOR OF ONE-HALF TO GEORGE VANDERPOOL, OF MAYFIELD, NEW YORK.

AUTOMATIC MEASURING AND REGISTERING APPARATUS FOR LIQUIDS.

SPECIFICATION forming part of Letters Patent No. 561,948, dated June 9, 1896.

Application filed October 1, 1895. Serial No. 564,320. (No model.)

*To all whom it may concern:*

Be it known that I, FREDERICK VANDERPOOL, a citizen of the United States, residing at Gloversville, in the county of Fulton and State of New York, have invented certain new and useful Improvements in Automatic Measuring and Registering Apparatus for Liquids, of which the following is a specification.

My invention is directed to the production of an improved apparatus for measuring, registering, and dispensing liquids, wherein a float, actuated by the liquid to be measured, operates in conjunction with registering mechanism to measure and to register any definite quantities in succession, and wherein the delivery of the measured quantity puts the float in position to repeat the measurement and registration.

My invention consists of certain novel parts and combinations of parts hereinafter specifically set forth in the claims concluding this specification.

The following description, read in connection with the drawings, will enable any one skilled in the art to which my invention relates to understand its nature and to practice it in the form in which I prefer to employ it; but it will be understood that my invention is not limited to the precise form and construction illustrated and described, as various modifications may be made in the details of construction.

Referring to these drawings, Figure 1 shows in elevation a vessel wherein the liquid is forced and measured and a registering device mounted upon the vessel and constructed to be operated by a float and to register the quantity of the inflow. Fig. 2 is a vertical section of the same, showing a device consisting of a multiple of wedge-brackets carried by and rising from the float for operating the register and for effecting the registration in pints. Fig. 3 is a vertical sectional elevation of the registering device, taken on the line *a a* of Fig. 4, which is an end view of the same. Fig. 5 is a vertical section of the same, taken on the line *b b* of Fig. 3; and Fig. 6 is a top view of the same. Fig. 7 shows in detail a portion of the multiple of wedge-brackets and their operative relation to a wicket escapement device which operates the register. Fig. 8 shows the wedge-brackets in position to operate the escapement by the inflow. Fig. 9 is a similar section showing the wedge-brackets in descending position in relation to the escapement caused by the outflow. Fig. 10 shows in detail the friction-wheel and its pawl connections for operating the long hand of the register. Fig. 11 shows in detail the cam and its pawl connections for operating the short hand of the register. Fig. 12, Sheet 1, shows the joint connection for the float and the device of wedge-brackets. Fig. 13, Sheet 2, shows the dial which indicates the measurements of gallons; and Fig. 14 shows in detail the spring friction-brake for the gallon-dial disk.

I have designed the apparatus for measuring and registering beer as it is dispensed from the bar in saloons; but it is obvious that the apparatus may be used for measuring and registering any free-flowing liquids. When used as a saloon-bar measurer and register, the measuring-vessel 1 is conveniently placed and connected by a rubber hose, which the pipe 2 may represent, with the barrel in the cellar or other place, the connection with the measuring-chamber 3 being made and controlled by a faucet having a two-way plug 4 in communication with the bottom of the measuring-chamber, as seen in Fig. 2, so that the liquid shall enter at the bottom of the chamber under force, either by gas or air pressure, from the supply, as required, and be dispensed in a glass or other receptacle by the same faucet after the measure of the inflow has been registered, as I shall now describe.

A float 5 of suitable buoyancy is placed in the measuring-chamber and is caused to rise and fall therein by the inflow and the outflow of the liquid. A stem or rod 6 centrally connects the float, extends through an opening in the top of the chamber, and has a multiple of separate inclines or wedge-brackets 7 for actuating the registering device to control and to indicate the quantity dispensed, as I shall presently state.

The registering device is placed upon the top of the vessel and comprises a suitable clockwork mounted in a frame. Of this clockwork 8 is the main shaft, which passes through the fixed face-dial shown in Fig. 1, and has the long hand 9 fixed to turn with the shaft and indicates on the dial the measures controlled by the wedge-brackets. A pinion 10, fixed on this shaft, engages a spur-gear 11, fixed on a lower shaft 12, whereon a pinion 13 is fixed and engages a gear 14 on a sleeve 15, loose on said shaft. This sleeve carries the short hand 16, which indicates on the fixed dial 17 the sum of the measured quantity in pints up to one hundred and forty-four, which are registered by the complete revolutions made by the long hand. Behind this fixed dial is a second dial 18, having a row of numbers which are arranged to register the number of pints beyond one hundred and forty-four, and which may also have an outer row of numbers to indicate the sum total of pints in gallons, as shown in Fig. 13. This second dial 18 is mounted to turn loosely upon the sleeve and is operated by a ratchet-wheel 19 20, which I prefer to fasten to the second dial, which is actuated as I shall presently state. On the main shaft 8 is fixed a friction-disk 21, and between the latter and the pinion 10 an arm 22 is loosely mounted on the main shaft, Figs. 5 and 10, and carries at its upper end a friction-pawl 23 in position to engage the friction-wheel 21 and turn it in the direction of the movement of the dial-hand 9. A spring 24 maintains the engagement of the pawl and friction-disk, and a spring-pressed friction-brake 25 serves to prevent the backward movement of the friction-disk. The arm 22 and its pawl 23 are caused to be vibrated together to turn the friction-disk and the dial-hand 9 by the rising and falling action of the multiple of wedge-brackets 7, which are carried by the float, and which are constructed to control the measure of specific quantities, as I shall presently state.

Pivotally connecting the upper end of the arm 22 is a link 26, standing horizontal and connecting pivotally the upper end of a rod 27, whose lower end passes through an opening in a cross rock-bar 28 and is secured by nuts 29, Fig. 4, whereby the said rod can be adjusted vertically. Passing through an opening in this cross-bar 28 is a shorter rod 30, pivotally connected at its lower end to one end of an open plate 31, Figs. 2, 7, 8, and 9, whose other end is pivotally connected to a rod 32, the upper end of which is adjustably connected to a cross rock-bar 33 by nuts 34 34, so that the open plate 31 is suspended by the rods 30 and 32, on which it has a horizontal swinging movement imparted to it by the wedge-brackets 7 to operate the registering-hands. The wedge-brackets are fixed to and stand out from the side of the float-connecting rod 6 with their points upward, so that the point of each terminates under and at the lower end of the next upper bracket, so as to form a succession of wedges in contiguous relation, each having the function of a wedge and each having the same extent of acting surface. They are arranged on the rod from the float upward, so that when the float is upon the bottom of the chamber, when the latter is empty, the point of the upper wedge-bracket will be at the top of the measuring-chamber and in position to engage the plate 31 by its escapement 39, which normally rests against the rod and pushes it with a swinging movement to the right, looking at Fig. 2. For this purpose the top of the chamber and the plate 31 have openings which permit the float-rod, with its wedge-brackets, to pass up through the suspended plate, as the entering liquid causes the float to rise, so that the inclined side of each bracket will act upon that part of the escapement-plate which rests against the rod and push said plate to the extent of the wedge-surface. The moment the wedge-surface passes above and free of its engaging escapement-plate the latter is forced back into its normal position against the rod to receive the point of the wedge next below, by means of a spring 35, fixed to the register-frame and to the rod 32, as in Fig. 2, so that the action of the wedges and spring gives to the suspended plate a reciprocating action as the float rises. This reciprocating movement of the plate causes the rods 27 and 30 to be vibrated, the action of the wedge-brackets moving the upper end of the rod 27 inward, which moves the upper end of the vertical arm 22, by its link connection 26, in the same direction, so that its pawl 23 will act upon the friction-wheel 21 and cause it to turn as long as the wedge is moving the plate 31. This turning of the friction-wheel turns the main shaft and moves the long hand to the right a distance from "12" to "1," Fig. 1, which will indicate the measurement of one pint in the chamber. In this way the full action of each wedge-bracket will indicate the measurement of one pint. The float-connecting rod is held in vertical position by guides 37 in the frame, and it is preferably connected to the float by a double joint 38. (Seen in detail at the bottom of the vessel in Fig. 2.)

As the wedge-brackets are caused to rise with the float-rod and pass above the suspended plate to cause it to actuate the registering device, provision must be made to allow the wedge-brackets to pass below this plate as the float falls in dispensing the measured liquid. For this purpose I provide the plate with a gate or wicket 39, Figs. 2, 7, 8, and 9, pivoted or hinged at 40 within the opening of the suspended plate, so that its inner end will practically form a part of the plate and receive the action of the wedge-brackets, but will not be raised by such wedge action. A spring 41, secured to the plate, bears down on the pivoted end of the gate, so as to hold it pressed upon a stop, which may be the plate 31 or the top of the vessel, leaving its end, acted on by the wedge-brackets, free to be pressed down to let them pass the gate as the float descends, as shown in Fig.

9. When the uppermost wedge-bracket shall have passed below the gate, the spring will return and hold it in a horizontal position in the opening in its carrying-plate.

During the registration by the long hand the main shaft operates the train of gear through the pinion 10 and causes the sleeve 15 to turn, and with it the short hand, so that twelve revolutions of the long hand will give one revolution of the short hand, and thereby register one hundred and forty-four pints, which will be indicated on the fixed dial 17 by the inner circle of numbers. A supplemental dial 18 is provided for registering the sum total of the measured pints above one hundred and forty-four, and for registering the number of gallons, as seen in Fig. 13. This second dial is fastened to the ratchet-wheel 19, which I prefer to make of a diameter equal to that of the dial, as shown in Figs. 2 and 3, and they both turn freely on the sleeve. This turning is effected by a cam 43, Figs. 3 and 11, fixed on the sleeve, and which engages and operates a slide or rod 44, supported on the register-frame and pivotally connected at its outer end to the lower end of a lever 45, pivoted at 46 to the frame, and having its upper end jointed to a pawl 47, which is arranged to engage the teeth 20 of the ratchet-wheel. One revolution of the cam 43 will cause the pawl 47 to move the ratchet-wheel one tooth, and thereby bring the dial-numbers in succession at the opening 42' just above the number "12" of the fixed face-dial. A spring 48, Fig. 3, constantly presses the slide inward and maintains the engagement of the slide with the cam, so that the latter gradually moves the pawl inward over the incline of the tooth to engage it, while the spring forces the pawl outward, thus turning the wheel one tooth. The cam is formed and set to commence the movement of the pawl simultaneously with the movement of the hands, and the extent of the inclines of the teeth is just equal to one revolution of the cam. A friction-spring 42 upon the sleeve 15 and bearing against the inner side of the toothed disk serves as a brake to hold the second-dial disk from turning by the inward movement of the pawl 47, the second-dial or toothed disk being for this purpose pressed against the inner side of the fixed dial, as shown in Figs. 5 and 14.

The capacity of the chamber may be one gallon, more or less; and I prefer to limit the number of wedge-brackets to eight, so that a gallon may be measured and delivered at once. The dial, however, has divisions showing quarter, half, and three-quarter pints, which can be controlled by the faucet-plug, which in Fig. 2 is shown in position to cut off communication both with the supply-pipe 2 and the measuring-chamber 3. By turning the faucet-plug to the left, as indicated by the dotted line 49, the beer will run from the supply into the chamber and raise the float, and by turning the faucet-plug to the right, as shown by the dotted line 50, the supply will be cut off, the faucet will be open to the discharge-nozzle 51, and the beer forced out by the descent of the float. These positions of the plug are limited by stops, as is well understood.

While I have shown the number of wedge-brackets as limiting the measurement to eight pints, which must be then discharged from the chamber, and the dial will register eight pints measured and dispensed, yet the dial is divided to register twelve pints for the convenience of registering continually and indicating the total quantity at the end of the day or other period in pints.

As stated, the inflow of beer causes the float to rise and the passing of each wedge-bracket up through the suspended plate moves it horizontally, and by the intermediate connections moves the pawl 23, turning the friction-wheel 21, moves the long hand from the starting-point "1" to "2," which is equal to and shows the measurement of one pint by the full movement and action of one wedge-bracket. During this measurement the short hand is caused to move in proportion by the gear which operates the sleeve 15, to which the short hand is fixed. The long hand moving once around registers twelve pints, and the short hand once around registers one hundred and forty-four pints, which is the limit of the registration. For further registration the second dial is provided, and after one hundred and forty-four pints have been registered every revolution of the short hand moves this second dial a distance equal to one tooth of the ratchet-wheel, which brings to the opening 42' the number "288" as the number of pints measured. In this way a continuous measurement will show "8640 pints" on the second dial. In like manner the one hundred and forty-four pints may show eighteen gallons, as illustrated by this second dial in Fig. 13. In this registration of the first one hundred and forty-four pints the revolution of the long hand will move the short hand from the numerals "144" to "12," always moving to the right. The second revolution of the long hand will move the short hand from "12" to "24," and so on, as the beer is measured and dispensed, the hands only moving when the wedge-brackets are in action and successively moving the suspended wicket-carrier.

In setting the apparatus with both hands at the numeral "12," as stated, the second dial must be moved to the left to bring the numerals "8640" (see Fig. 13) at the opening in the fixed dial, and the register can be locked and left. When the short hand indicates that one hundred and forty-four pints have been drawn and dispensed, the second dial will be moved by the cam one tooth, and the numerals "144" will appear and stay in the opening 42', as seen in Fig. 1, until the short hand makes another round, when the second dial will be moved another tooth and the numerals "288" will appear at the said opening, and so on until the numerals "8640"

are reached, which will indicate that number of pints. The gallons are indicated by the outer row of numerals on this second dial, from which it will be seen that the one hundred and forty-four pints show eighteen gallons, and eight thousand six hundred and forty pints one thousand and eighty gallons. The apparatus must then be reset for a new registration.

The registering device is inclosed by a casing, (shown by dotted lines in Fig. 1,) and a door is provided for access to the dial to take the registration already made and to set the hands to the numeral "12" to commence the registration anew. In this way it can be seen whether the barrel the contents of which has been measured contained the proper number of gallons and whether the receipts agree with the sales.

The measuring-chamber can be made of copper or glass, and the float is hollow and preferably made of thin copper. Its connecting-stem is made of the proper stiffness and fitted in guides that will give the least resistance to its rising, while the wicket, with which the wedge-bracket stem coöperates, is fitted and arranged in a carrier mounted and suspended to have a free reciprocating movement like a pendulum, in which the floating-stem, its separate step-like inclines or tappets, and the wicket form in their conjoint action a sort of escapement motion transmitted to the dial-hands in a way to measure and to register exact quantities.

I prefer to provide the pawl 23 and the brake 25 for operating the friction-disk with leather or other flexible tips, so that the pawl will give the proper frictional engagement to turn the disk, and the brake to hold it from turning as the pawl moves back to the position again to turn the disk.

I prefer to hang the float to the stem, so that in rising it will not tend to bind or cramp the stem in its guides, which are arranged in the registering device and are of such construction as to keep the rod vertically true against the tendency of the wedge-brackets to deflect it.

The spring 35 has only sufficient force to return the wicket-carrier to its normal position, and therefore the wedge-brackets will act quite easy in moving the carrier against the force of such spring.

For the proper adjustment of the wicket-carrier with relation to the top of the measuring-chamber and to the float-stem the suspending-rods 30 and 32 are made vertically adjustable by the nuts 34, Figs. 2 and 4, while for the proper adjustment of the stroke of the friction-pawl 23 the rod 27 is made vertically adjustable by the nuts 29 29, Fig. 4. In connection with such adjustments it will be understood that the extent of the acting surfaces of the brackets will be such as to time the vibrations of the suspended wicket-carrier and the movements of the dial-hands to effect the registration in pints. It will be understood that while I have shown and described the float as having combined therewith the number of wedge-brackets for measuring successive pints up to a gallon and for actuating mechanism for registering such measures in successive order up to a gallon, yet my invention is not limited to such number of measuring devices nor to the measurement only of pints, so long as these measuring devices, if more than one be used, be of equal measuring capacity of surface for operating the registering mechanism in a way to indicate equal measures.

While I have shown and prefer to use a faucet adapted to effect the inflow into and the outflow from the measuring-chamber, yet separate faucets may be used for this purpose.

It will also be understood that while I have shown and prefer the friction-pawl device for communicating the action of the wedge-measurers to the registering mechanism, yet different and equivalent connections may be substituted that will give the stated movement to the dial-hands.

While I prefer to suspend the gate or wicket for free swinging movement, yet it may have the action of a slide.

I claim as my improvement—

1. In an automatic measuring and registering apparatus, the combination with a measuring-chamber, of a float having one or more rigidly-sustained wedge devices movable therewith and a registering mechanism operated with a determined and exact measure by said wedge device to effect a record of such measure, in the way described.

2. The combination, with a measuring-chamber, a float having a vertical connected rod provided with a multiple of wedge-brackets arranged one above the other in contiguous relation, a spring-sustained gate or wicket suspended or supported to receive the action of such wedge-brackets to vibrate said gate in one direction, means for vibrating the gate in the opposite direction, suspending connections for said gate, a registering mechanism, and suitable pawl connections for transmitting the vibrations of the said gate or wicket to the registering-hands for measuring and registering exact quantities, in the way stated.

3. In an automatic measuring and registering apparatus, the combination with a measuring-chamber, of a float having separate measure-determining inclines or projections fixed upon a vertically-sustained rod or stem, a gate device arranged to receive the action of such inclines, or projections, springs for maintaining the said gate in position to receive such action, suspending connections for said gate, registering mechanism and a friction-pawl device arranged to communicate the vibratory movements of said gate to the registering-hands.

4. In an automatic measuring and registering apparatus, the combination, with a measuring-chamber, of a float having separate measure-determining inclines or projections vertically guided with the movement of the float, a gate or wicket device sustained to be vibrated by said inclines, a fixed and a movable dial and intermediate gear and rod connections for communicating the action of the separate measuring determining inclines to register the measure in the way described.

5. In an automatic measuring and registering apparatus, the combination, with a measuring-chamber, of register mechanism mounted thereon, a float in said chamber controlled by the inflow and the outflow, a rod or stem flexibly jointed to said float, fitted for vertical movement in guides in the register-frame, and having separate measure-determining inclines or projections, arranged in contiguous relation one above the other, a gate or wicket device sustained in position to be freely vibrated by the joint action of said inclines or projections and a spring and suitable intermediate operating connections for communicating the vibratory movements of the inclines to the registering mechanism in the way set forth.

6. In an automatic measuring and registering apparatus, the combination, with a measuring-chamber, of a float having a multiple of rigidly-sustained measuring inclines or projections vertically movable therewith for effecting determined and exact measures by the rising action of the float governed by the extent of each incline, mechanism for operating the registering-hands of a dial, an intermediate gate or wicket device arranged to receive the action of the inclines, suspending connections for said gate or wicket, and means for maintaining said gate or wicket in position to receive the successive actions of the said inclines to vibrate the said suspending connections and communicating such vibrations to the registering-hands, in the way described.

7. In an automatic measuring and registering apparatus, the combination, of a measuring-chamber with a float operated by the liquid to be measured having a stem or rod vertically guided and provided with a multiple of wedge-brackets or tappets arranged in contiguous relation one above the other, suitable registering mechanism, and a vibratable escapement device connecting said registering mechanism and having a spring-sustained gate or wicket arranged to receive the successive rising action of the wedge-brackets, to vibrate said escapement device and operate the register and means for returning such gate for such successive action, the said gate or wicket being adapted to be pressed down against the action of a spring by the descent of the wedge-brackets to allow them to successively pass the gate without operating the register connections, substantially in the way stated.

8. In an automatic measuring and registering apparatus, a measuring-chamber and a float having a vertically-guided stem or rod provided with separate wedge-brackets arranged in contiguous relation one above the other, standing with their points upward, in combination with mechanism arranged to receive and be operated by the successive rising actions of the wedge-brackets and suitable connected mechanism for registering the measuring action of each separate wedge-bracket in the way stated.

9. In an automatic measuring and registering apparatus, the combination of a measuring-chamber, with a float operated by the liquid to be measured, having a vertically-guided stem or rod provided with a multiple of wedge-brackets or tappets arranged in contiguous relation one above the other, suitable registering mechanism, a plate having a spring-sustained gate or wicket arranged to receive as an abutment the successive action of the said separate wedge-brackets, suitable suspending connections for such plate and a spring arranged to resist the action of such wedge-brackets on said plate, a pawl operated by said suspending connections, and registering mechanism operated by said pawl, whereby each wedge-bracket is caused to measure and to register the liquid in pints.

10. In an automatic measuring and registering apparatus, the combination, with a measuring-chamber, of a float, having a vertically-guided stem or rod provided with a multiple of wedge-brackets arranged in contiguous relation, a spring-sustained gate or wicket arranged to receive the action of such wedges, rod connections 30 32 for suspending and adjusting said gate in relation to the wedge-brackets, suitable registering mechanism connected for operation by the reciprocating movements of said gate, and the connections 27, 26, 22 and a friction-pawl device 23 and 21 for connecting said registering mechanism with said gate-suspending connections for operation in the way described.

11. In an automatic measuring and registering apparatus, the combination, with a measuring-chamber, of a float carrying in vertical position a multiple of wedge-brackets arranged in contiguous relation, a spring-sustained gate or wicket arranged to receive the action of said wedge-brackets, a carrier for said gate, rod connections for suspending said carrier in relation to the wedges, a train of gear, suitable pawl connections for said gear and for the suspending connections for transmitting the reciprocating movements of the gate to said pawl connections to actuate the dial-hands, a cam operated by said gear a secondary dial independent of said gear and suitable pawl connections actuated by the cam for operating the secondary dial in the way and for the purpose stated.

12. In an automatic measuring and registering apparatus, the combination, with a measuring-chamber, of a float having separate measure-determining inclines or projections, a gate or wicket sustained to be reciprocated by said inclines, a fixed dial having an opening, a movable dial arranged to show its numerals at said opening and suitable gear and rod connections for operating the fixed-dial hands and for independently rotating the movable dial by the successive actions of the wedge-inclines, substantially in the way and for the purpose stated.

13. The combination, with a measuring-chamber, and suitable registering mechanism, of a float having a multiple of wedge brackets or inclines arranged in contiguous relation one above the other, a gate or wicket arranged to be moved horizontally against the action of a spring, by the rising action of each wedge, and to be pressed down against the action of the spring by the descent of said wedge-brackets and suitable mechanism for communicating the wedge-produced movements of the gate to the registering mechanism, substantially as described.

14. In an automatic measuring and registering apparatus, the combination, with a measuring-chamber, of a float having a multiple of wedge-brackets or projections arranged in contiguous relation one above the other, a gate or wicket arranged to be moved horizontally against the force of a retracting-spring, by the ascending action of each wedge-bracket, and to be depressed against the action of a retracting-spring by the descent of each wedge-bracket, a fixed dial, suitable registering mechanism and connections for communicating to said registering mechanism the wedge-produced movements of the gates or wickets, a movable dial and a ratchet-wheel for operating it, a cam operated by said registering mechanism and ratchet connections 44, 45 and 47 engaging the cam and the ratchet for operating the latter, substantially as described.

FREDERICK VANDERPOOL.

Witnesses:
GEORGE REED,
NORMAN L. ADAMS.